(12) United States Patent
Chen (10) Patent No.: US 10,920,904 B2
(45) Date of Patent: Feb. 16, 2021

(54) FLUSH VALVE

(71) Applicant: Sheng-Hsien Chen, Taoyuan (TW)

(72) Inventor: Sheng-Hsien Chen, Taoyuan (TW)

( * ) Notice: Subject to any disclaimer, the term of this patent is extended or adjusted under 35 U.S.C. 154(b) by 230 days.

(21) Appl. No.: 16/234,703

(22) Filed: Dec. 28, 2018

(65) Prior Publication Data

US 2020/0208754 A1 Jul. 2, 2020

(51) Int. Cl.
*F16K 31/40* (2006.01)
*E03D 5/10* (2006.01)

(52) U.S. Cl.
CPC ............ *F16K 31/402* (2013.01); *E03D 5/105* (2013.01)

(58) Field of Classification Search
CPC ............................ F16K 31/402; F16K 31/3855
See application file for complete search history.

(56) References Cited

U.S. PATENT DOCUMENTS

| | | | | |
|---|---|---|---|---|
| 6,000,674 A | * | 12/1999 | Cheng | ........................ E03D 3/06 137/545 |
| 9,850,644 B1 | * | 12/2017 | Huang | ................... F16K 31/402 |
| 2004/0056223 A1 | * | 3/2004 | Wilson | ................... F16K 31/404 251/42 |
| 2011/0017929 A1 | * | 1/2011 | Guler | ........................ E03D 3/06 251/129.01 |
| 2011/0121213 A1 | * | 5/2011 | Johnson | .................... E03D 3/02 251/30.03 |
| 2013/0082198 A1 | * | 4/2013 | Herbert | ............... F16K 31/3855 251/118 |

* cited by examiner

*Primary Examiner* — Kelsey E Cary
(74) *Attorney, Agent, or Firm* — Alan D. Kamrath; Mayer & Williams PC (57) ABSTRACT

A flush valve has a valve body, a relief assembly, and a solenoid valve assembly. The valve body has a flushing tube. The solenoid valve assembly has a seal, an assembling mount, a solenoid valve, and a power supply. The seal is disposed between a diaphragm of the relief assembly and an intake end of the flushing tube. The assembling mount has a disk. A first reserving space is formed between the disk and the relief assembly. The solenoid valve is assembled to the assembling mount. A second reserving space is formed between the solenoid valve and the assembling mount and communicates with the first reserving space. The solenoid valve has a blocking unit to prevent the first reserving space and the second reserving space from communicating with each other. The power supply is electrically connected to the solenoid valve.

16 Claims, 9 Drawing Sheets

FLUSH VALVE

BACKGROUND OF THE INVENTION

1. Field of the Invention

The present invention relates to a flush valve, and more particularly to a flush valve equipped with a solenoid valve assembly and being capable of saving money and time for modification.

2. Description of Related Art

Figure 8:
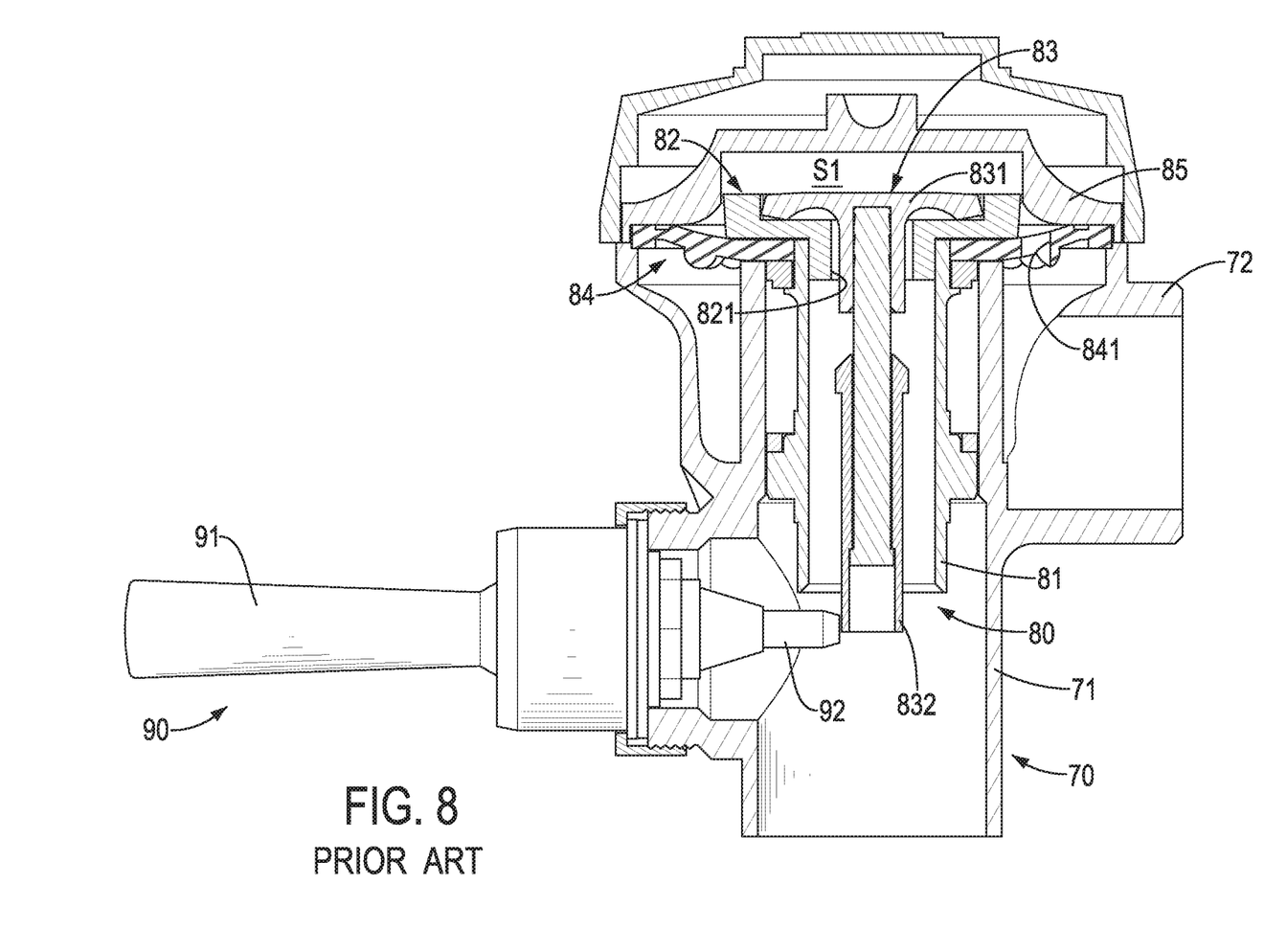
FIG. 8 is a side view in partial section of a flush valve in accordance with the prior art.
Figure 9:
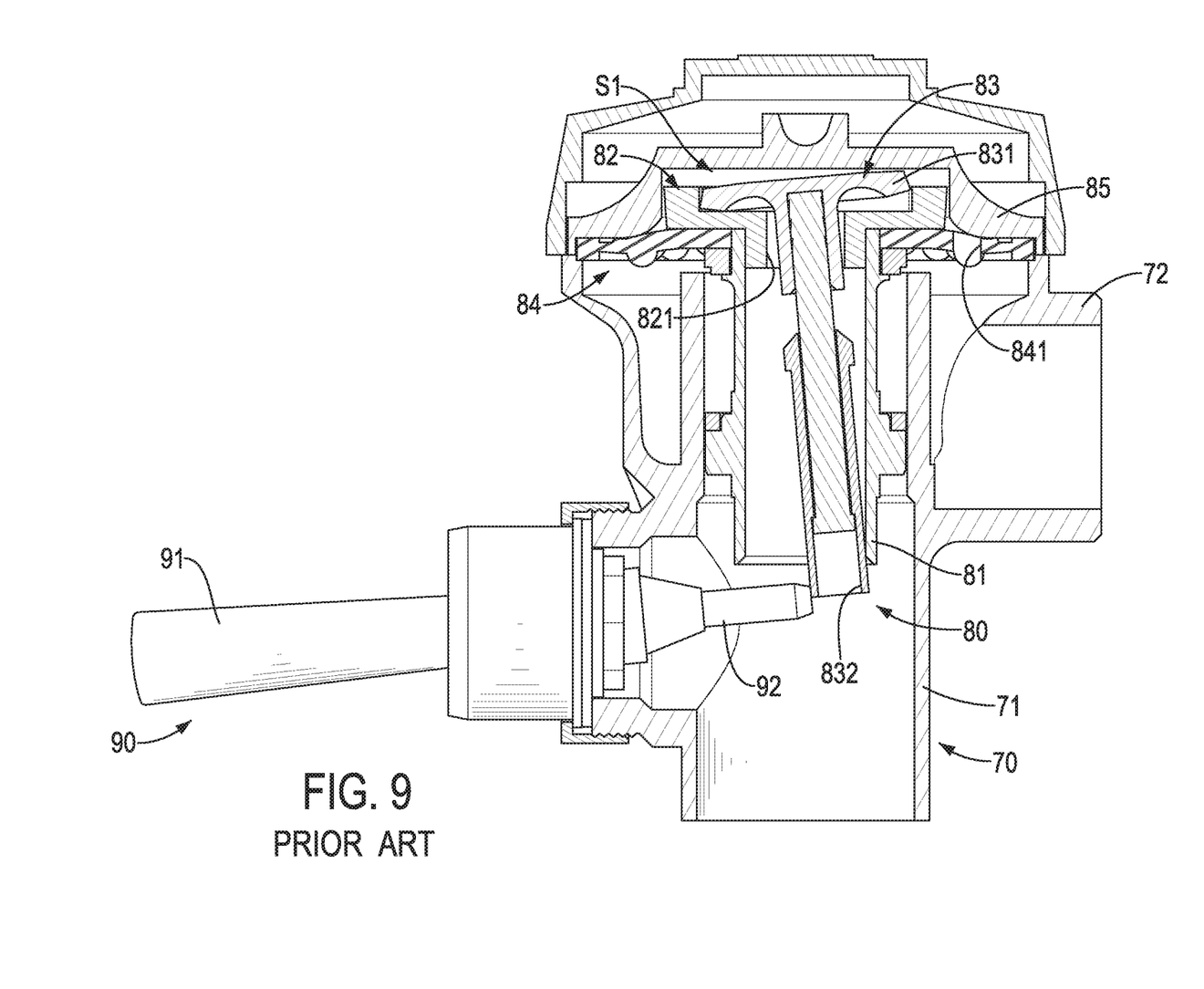
FIG. 9 is a schematic side view in partial section of the flush valve in FIG. 8.

A flush valve is applied to public restrooms. The flush valve is equipped in coordination with urinals, squat toilets, or seated toilets. With reference to FIGS. 8 and 9, a conventional flush valve has a valve body 70, a relief assembly 80, and a manual assembly 90. The relief assembly 80 and the manual assembly 90 are assembled to the valve body 70.

The valve body 70 has a flushing tube 71 and an inlet port 71. The flushing tube 71 has an intake end and an outlet end opposite each other in an longitudinal direction of the flushing tube 71. The inlet port 72 communicates with the intake end of the flushing tube 71 and is connected to a water supply.

The relief assembly 80 has a guiding member 81, a restricting disk 82, a relief valve 83, a diaphragm 84, and an inside cover 85. The guiding member 81 is tubular and is inserted inside the flushing tube 71. The restricting disk 82 is fixed to the guiding member 81 and is disposed adjacent to the intake end of the flushing tube 71. The restricting disk 82 has a through hole 821 communicating with inside of the guiding member 81.

The relief valve 83 is assembled to the restricting disk 82 and has a valve head 831 and a valve stem 832. The valve head 831 blocks the through hole 821. The valve stem 832 is connected to the valve head 831, passes through the through hole 821 and the guiding member 81, and extends into the flushing tube 71. The diaphragm 84 is circular and is mounted on and around the guiding member 81. The diaphragm 84 is disposed between the restricting disk 82 and the intake end of the flushing tube 71. The diaphragm 84 is elastic and has a central portion being capable of rising upward such that the inlet port 71 and the intake end of the flushing tube 71 communicate with each other. The central portion of the diaphragm 84 is capable of sinking downward to block the inlet port 71 and the intake end of the flushing tube 71. The diaphragm 84 has multiple communicating holes 841 disposed around the guiding member 81. The multiple communicating holes 841 are multiple through holes.

The inside cover 85 is made of metal or plastic and is disposed above the relief valve 83. A first reserving space S1 is formed between the inside cover 85 and the restricting disk 82 for reserving water. The water reserving space S1 communicates with the inlet port 72 via the multiple communicating holes 841.

The manual assembly 90 has a manual handle 91 disposed outside the valve body 70 and a plunger 92 that is connected to the manual handle 91. The plunger 91 enters the valve body 70.

Water introduced from the water supply enters the water reserving space S1 via the multiple communicating holes 841 of the diaphragm 84. Water in the water reserving space S1 presses the diaphragm 84 to sink the central portion of the diaphragm 84 and to prevent the inlet port 72 and the intake end of the flushing tube 71 from communicating with each other.

When the manual handle 91 is pressed, the plunger 92 pushes the valve stem 832, and the valve head 831 no longer blocks the through hole 821. Water in the water reserving space S1 enters the guiding member 81 via the through hole 821 and discharges from the outlet end of the flushing tube 71. When the diaphragm 84 is no longer subjected to pressure provided from the water reserving space S1, the central portion of the diaphragm 84 rises such that the inlet port 72 and the intake end of the flushing tube 71 communicate with each other. Water from the water supply is directly introduced into the flushing tube 71 and discharges at large flows.

In order to promote user experience of restrooms, flush valves with sensor-operating function are commonly applied to public restrooms. The flush valves with sensor-operating function can avoid the user's direct contact with the manual handle 91 and is more hygienically in use. With the sensor-operating function, the flush valves can detect practical usage condition and modify flow accordingly for water saving. However, to replace the conventional flush valve by the flush valve with sensor-operating function, the conventional flush valve has to be completely removed, which consumes a lot of time and money.

A kind of flush valve with an electrically operated plunger is invented. The electrically operated plunger is driven by an electrical motor and gears, consumes a lot of energy, and is not eco-friendly. There are also replacement parts invented for replacing upper parts of the conventional flush valve with the entire relief assembly. However, after replaced by these replacement parts, not only the original relief assembly is completely replaced, but also the manual function of the conventional flush valve cannot be preserved. The replacement parts limit the function of the conventional flush valve and cause the disposal of the entire relief assembly.

To overcome the shortcomings of the conventional flush valve, the present invention provides a flush valve to mitigate or obviate the aforementioned problems.

SUMMARY OF THE INVENTION

The main objective of the present invention is to provide a flush valve that can easily be modified to be equipped with a sensor-operating function and can reduce time and money consumption for modification.

The flush valve comprises a valve body, a relief assembly, and a solenoid valve assembly. The valve body has a flushing tube. The solenoid valve assembly has a seal, an assembling mount, a solenoid valve, and a power supply. The seal is disposed between a diaphragm of the relief assembly and an intake end of the flushing tube. The assembling mount has a disk. A first reserving space is formed between the disk and the relief assembly. The solenoid valve is assembled to the assembling mount. A second reserving space is formed between the solenoid valve and the assembling mount and communicates with the first reserving space. The solenoid valve has a blocking unit to prevent the first reserving space and the second reserving space from communicating with each other. The power supply is electrically connected to the solenoid valve.

Other objects, advantages, and novel features of the invention will become more apparent from the following detailed description when taken in conjunction with the accompanying drawings.

DETAILED DESCRIPTION OF PREFERRED EMBODIMENTS

Figure 1:
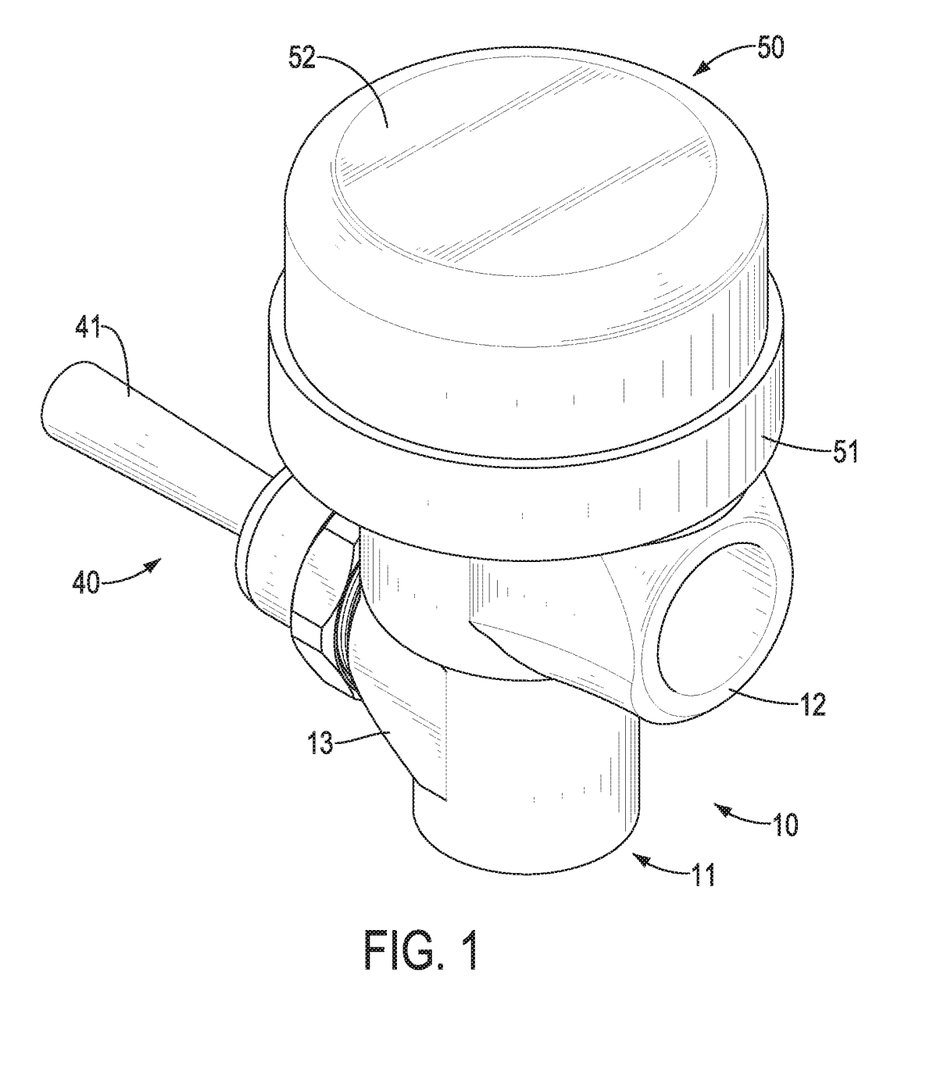
FIG. 1 is a perspective view of a flush valve in accordance with the present invention.
Figure 2:
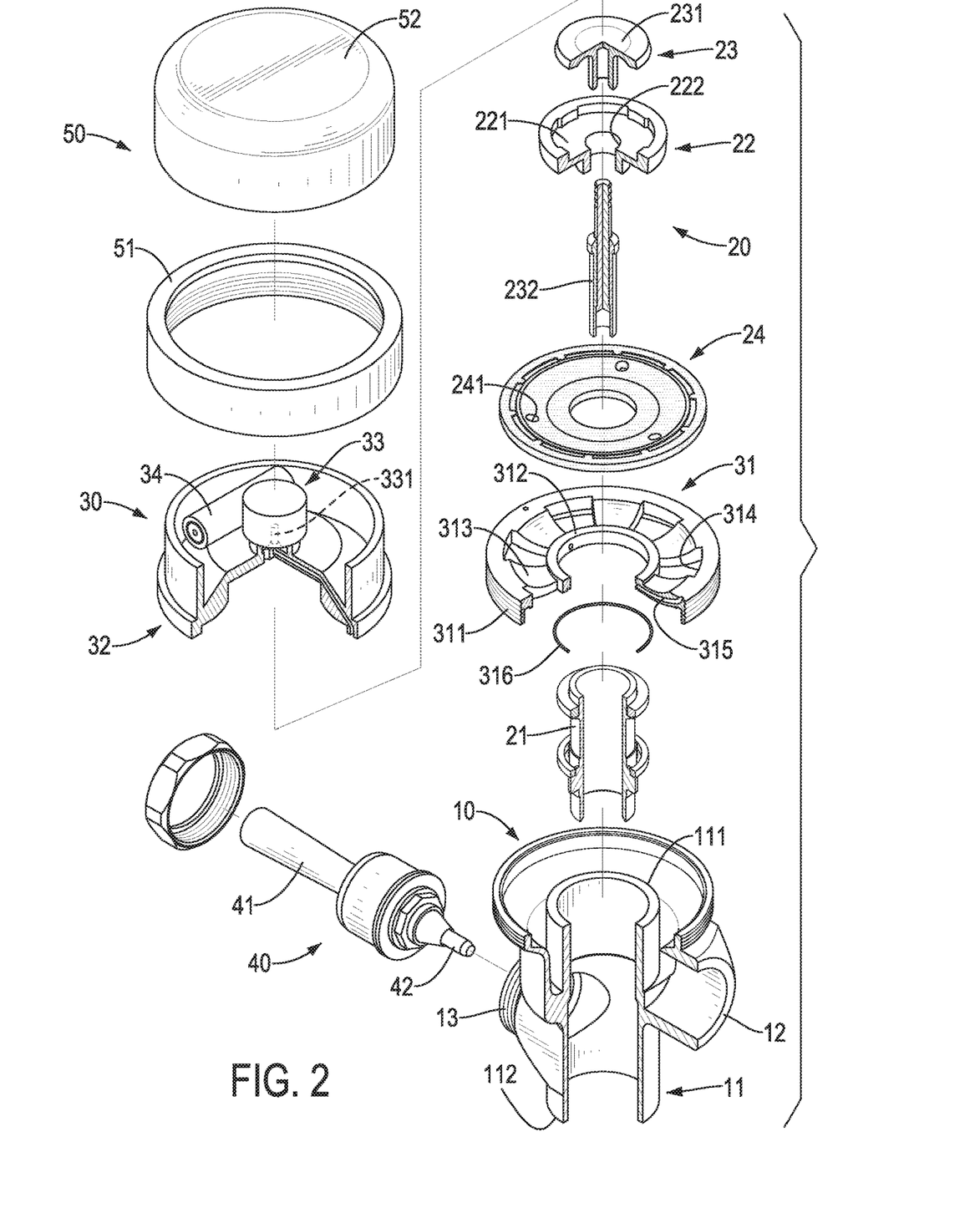
FIG. 2 is a partially exploded perspective view of the flush valve in FIG. 1.

With reference to FIGS. 1 and 2, a flush valve in accordance with the present invention has a valve body 10, a relief assembly 20, a solenoid valve assembly 30, a manual assembly 40, and a covering set 50. The relief assembly 20, the solenoid valve assembly 30, the manual assembly 40, and the covering set 50 are assembled to the valve body 10.

Figures 3A, 3B:
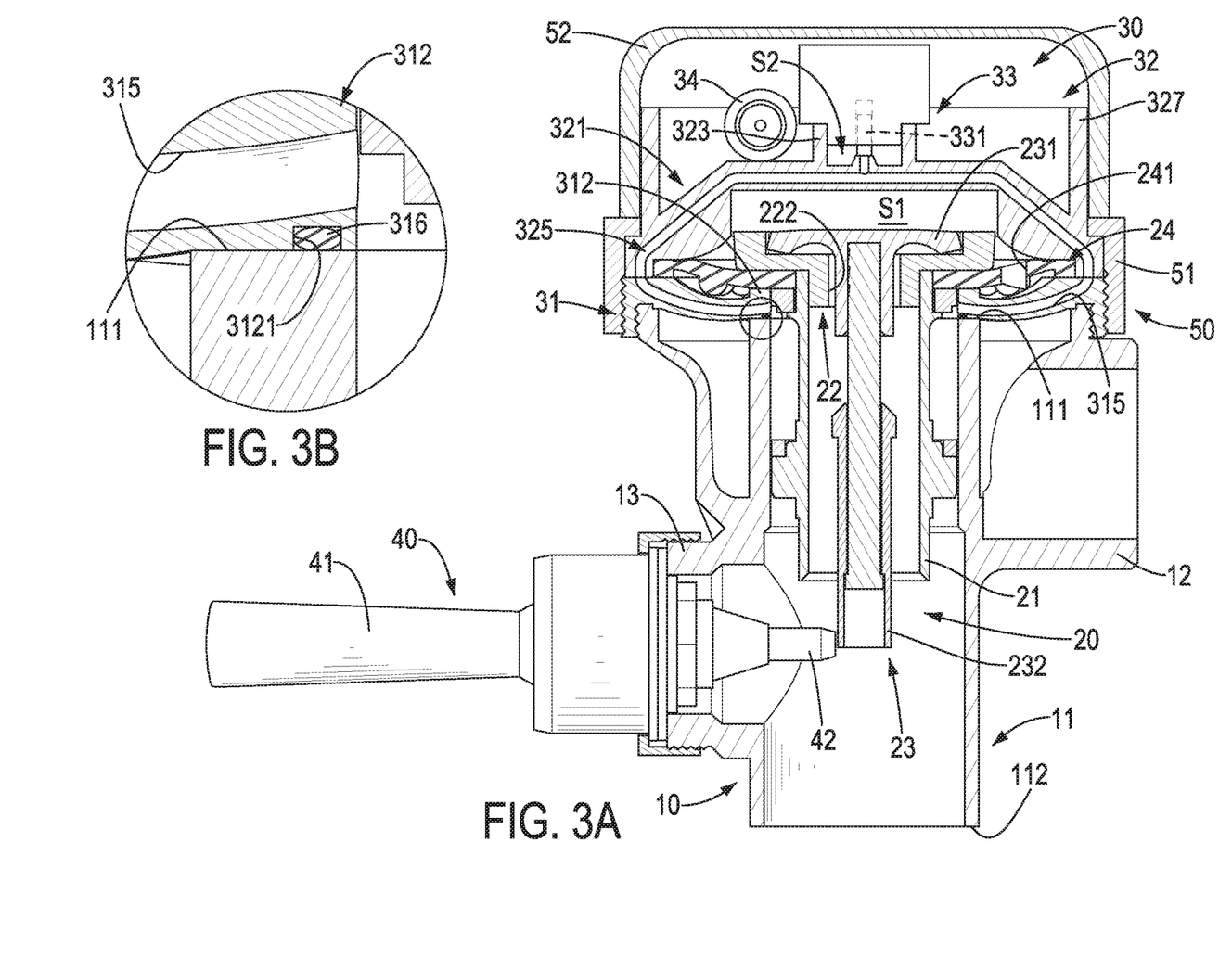
FIG. 3A is a side view in partial section of the flush valve in FIG. 1.
FIG. 3B is an enlarged side view in partial section of the flush valve in FIG. 3A.
Figures 4A, 4B:
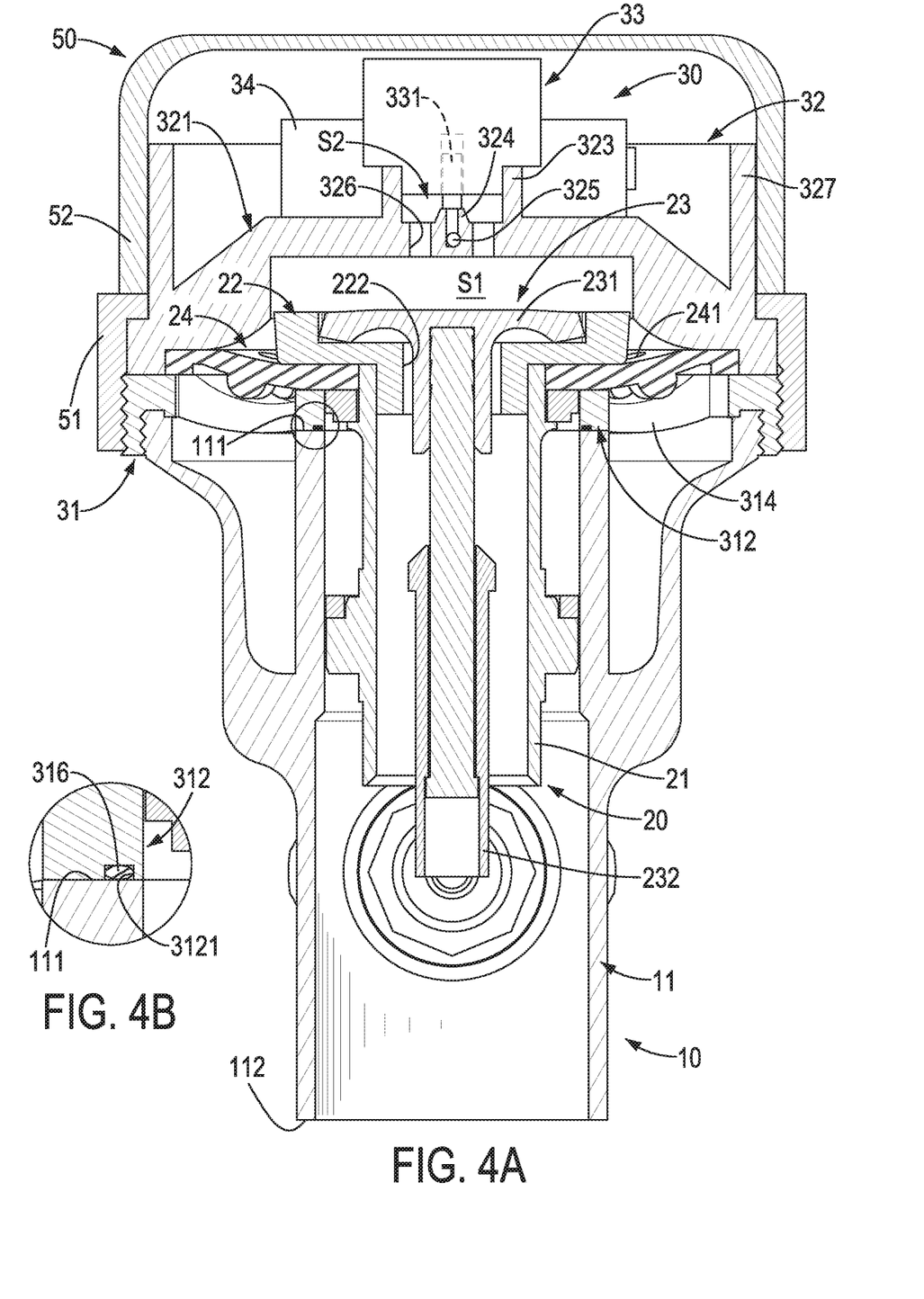
FIG. 4A is another side view in partial section of the flush valve in FIG. 1.
FIG. 4B is an enlarged side view in partial section of the flush valve in FIG. 4A.

With reference to FIGS. 2 and 3, the valve body 10 has a flushing tube 11, an inlet port 12, and an assembling port 13. The flushing tube 11 is disposed at a central position on the valve body 10 and has an intake end 111 and an outlet end 112. The intake end 111 and the outlet end 112 of the flushing tube 11 are opposite each other. In FIGS. 2 and 3, the intake end 111 and the outlet end 112 of the flushing tube 11 are opposite each other in a longitudinal direction of the flushing tube 11. The inlet port 12 communicates with the intake end 111 of the flushing tube 11. The assembling port 13 communicates with inside of the flushing tube 11.

With reference to FIGS. 2 and 3, the relief assembly 20 has a guiding member 21, a restricting disk 22, a relief valve 23, and a diaphragm 24. The guiding member 21 is tubular, is inserted in the flushing tube 11, and is capable of moving along the flushing tube 11 longitudinally. The restricting disk 22 is fixed to the guiding member 21 and is disposed adjacent to the intake end 111 of the flushing tube 11. The restricting disk 22 has a receiving recess 221 and a through hole 222 defined through a bottom of the receiving recess 221. The through hole 222 communicates with inside of the guiding member 21.

With reference to FIGS. 2 and 3, the relief valve 23 has a valve head 231 and a valve stem 232. The valve head 231 is received in the receiving recess 221 and blocks the through hole 222. The valve stem 232 is connected to the valve head 231. The valve stem 232 passes through the through hole 222 and the guiding member 21 and then extends into the flushing tube 11. The diaphragm 24 is circular and is mounted on and around the guiding member 21. The diaphragm 24 is disposed below the restricting disk 22. The diaphragm 24 is made of rubber, silicone rubber, or other elastics. Therefore, a central portion of the diaphragm 24 is capable of rising or sinking. The diaphragm 24 has multiple communicating holes 241 disposed around the guiding member 21 at spaced intervals.

With reference to FIGS. 2 to 5, the solenoid valve assembly 30 has a seal 31, an O-ring 316, an assembling mount 32, a solenoid valve 33, and a power supply 34. The seal 31 has a mounting ring 311, a communicating ring 312, multiple connecting portions 313, multiple communicating openings 314, and two discharging channels 315. The mounting ring 311 is screwed with the valve body 10 and has an outer diameter. The communicating ring 312 is coaxially disposed within the mounting ring 311. The multiple connecting portions 313 surround the communicating ring 312 separately. Each one of the multiple communicating openings 314 is disposed between two adjacent connecting portions 313 of the multiple connecting portions 313. The two discharging channels 315 are respectively formed through two of the multiple connecting portions 313 that are opposite each other in a diametric direction of the seal 31. Each one of the two discharging channels 315 is defined in a top face of the seal 31 and extends inside the communicating ring 312.

Figure 5:
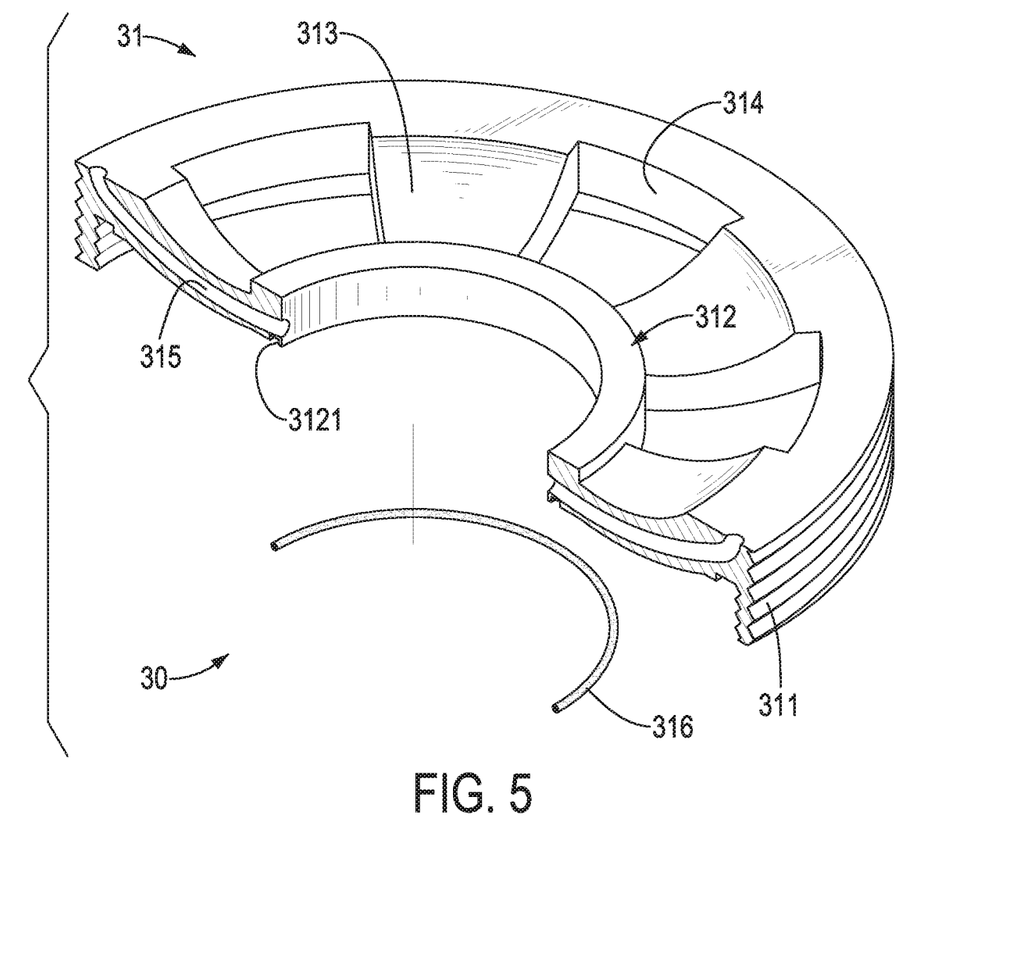
FIG. 5 is a partially exploded perspective view in partial section of a solenoid valve of the flush valve in FIG. 2.

With reference to FIGS. 2, 3, and 5, the communicating ring 312 is mounted on and around the guiding member 21, and the mounting ring 311 of the seal 31 is assembled to the valve body 10. The seal 31 is disposed between the diaphragm 24 and the intake end 111 of the flushing tube 11. The seal 31 abuts against the intake end 111 of the flushing tube 11, and the seal 31 is abutted by the diaphragm 24. The two discharging channels 315 extending inside the communicating ring 312 communicate with the intake end 111 of the flushing tube 11. In the embodiment of the present invention, the seal 31 is made of metal. The communicating ring 312 has a circular groove 3121 for receiving the O-ring 316. The O-ring 316 may be made of rubber, silicone rubber, or other elastics. The O-ring 316 is received in the circular groove 3121 and is clamped between the communicating ring 312 and the intake end 111 of the flushing tube 11.

Figure 6:
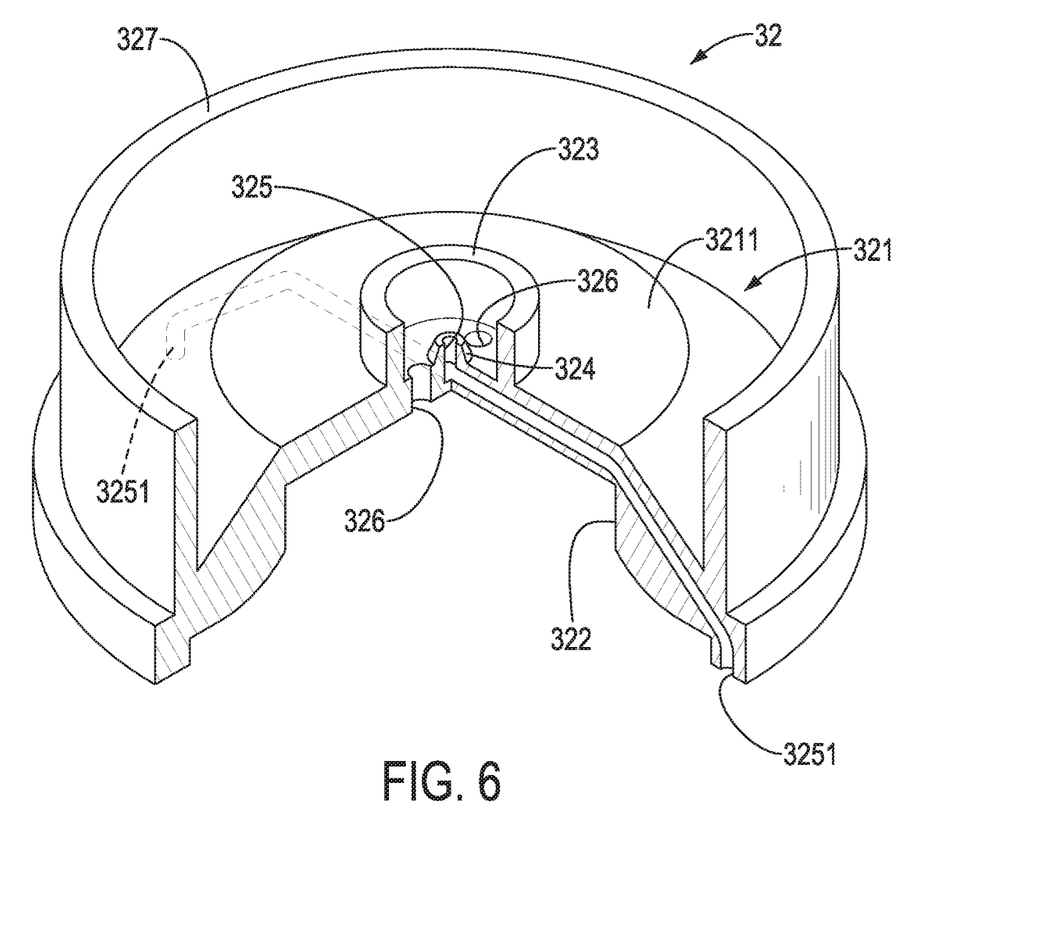
FIG. 6 is another enlarged view in partial section of an assembling mount of the flush valve in FIG. 1.

With reference to FIGS. 2, 3, and 6, the assembling mount 32 is made of plastic with formability. The assembling mount 32 has a disk 321, a reserving recess 322, a baffle wall 323, a conical protrusion 324, a flowing channel 325, two flowing holes 326, and a circular wall 327. The disk 321 has two opposite sides and a disk surface 3211 disposed at one of the two opposite sides of the disk 321. The reserving recess 322 is disposed at the other one of the two opposite sides of the disk 321 and is defined in a central portion of the disk 321. The baffle wall 323 is circular, is connected to the disk surface 3211, and is disposed at the central portion of the disk 321. The conical protrusion 324 is connected to the disk surface 3211 of the disk 321, is disposed at the central portion of the disk 321, and is disposed within the baffle wall 323. The flowing channel 325 defined through the conical protrusion 324 is disposed at the central portion of the disk 321. The flowing channel 325 extends inside the disk 321, extends along a diametric direction of the disk 321, and extends to a rim of the disk 321 to form two openings 3251 corresponding to the two discharging channels 315. The two flowing holes 326 are defined through the central portion of the disk 321, communicate with the reserving recess 322, and are disposed within the baffle wall 323. The circular wall 327 is connected to the disk surface 3211 of the disk 321 and surrounds the baffle wall 323.

The assembling mount 32 is disposed above the seal 31 and abuts against the mounting ring 311 of the seal 31. The two openings 3251 respectively align with the two discharging channels 315, and the flowing channel 325 communicates with the two discharging channels 315 via the two openings 3251. A first reserving space S1 is disposed between the reserving recess 322 and the relief assembly 20. The reserving space S1 communicates with the inlet port 12 of the valve body 10 via the multiple communicating holes 241 of the diaphragm 24 and the multiple communicating openings 314 of the seal 31.

The solenoid valve 33 is capable of electrically connecting to a sensor. With reference to FIGS. 2 and 3, the solenoid valve 33 is assembled to the baffle wall 323. A second reserving space S2 is enclosed by the solenoid valve 33, the disk 321 of the assembling mount 32, and the baffle wall 323. The second reserving space S2 communicates with the flowing channel 325. The solenoid valve 33 has a blocking unit 331 capable of blocking the flowing channel 325. The second reserving space S2 communicates with the first reserving space S1 via the two flowing holes 326.

With reference to FIGS. 2 and 3, the power supply 34 electrically connects to the solenoid valve 33. The power supply 34 may be implemented as at least one battery.

With reference to FIGS. 2 and 3, the manual assembly 40 is mounted to the assembling port 13 of the valve body 10. The manual assembly 40 has a manual handle 41 and a plunger 42. The manual handle 41 is disposed outside the valve body 10. The plunger 42 is connected to the manual handle 41 and extends into the flushing tube 11 of the valve body 10. The plunger 42 is capable of pushing the valve stem 232 that extends into the flushing tube 11.

With reference to FIGS. 2 and 3, the covering set 50 has a fastening collar 51 and a cover 52. The fastening collar 51 has an inner thread. The fastening collar 51 is screwed with the seal 31 and presses the assembling mount 32 to force the assembling mount 32 to abut against the seal 31. The cover 52 is mounted on and around the circular wall 327 to protect the solenoid valve 33 and the power supply 34 from exposure.

The inlet port 12 of the valve body 10 is capable of connecting to a water supply. Water introduced from the water supply enters the first reserving space S1 via the multiple communicating openings 314 of the seal 31 and the multiple communicating holes 241 of the diaphragm 24. When the first reserving space S1 is filled, water enters the second reserving space S2 via the two flowing holes 326 of the assembling mount 32. Since the blocking unit 331 of the solenoid valve 33 blocks the flowing channel 325 to prevent water in the first reserving space S1 and the second reserving space S2 from flowing via the flowing channel 325, water in the first reserving space S1 applies pressure to the diaphragm 24. The central portion of the diaphragm 24 sinks and presses the communicating ring 312 of the seal 31 to prevent the inlet port 12 and the intake end 111 of the flushing tube 11 from communicating with each other.

Figures 7A, 7B:
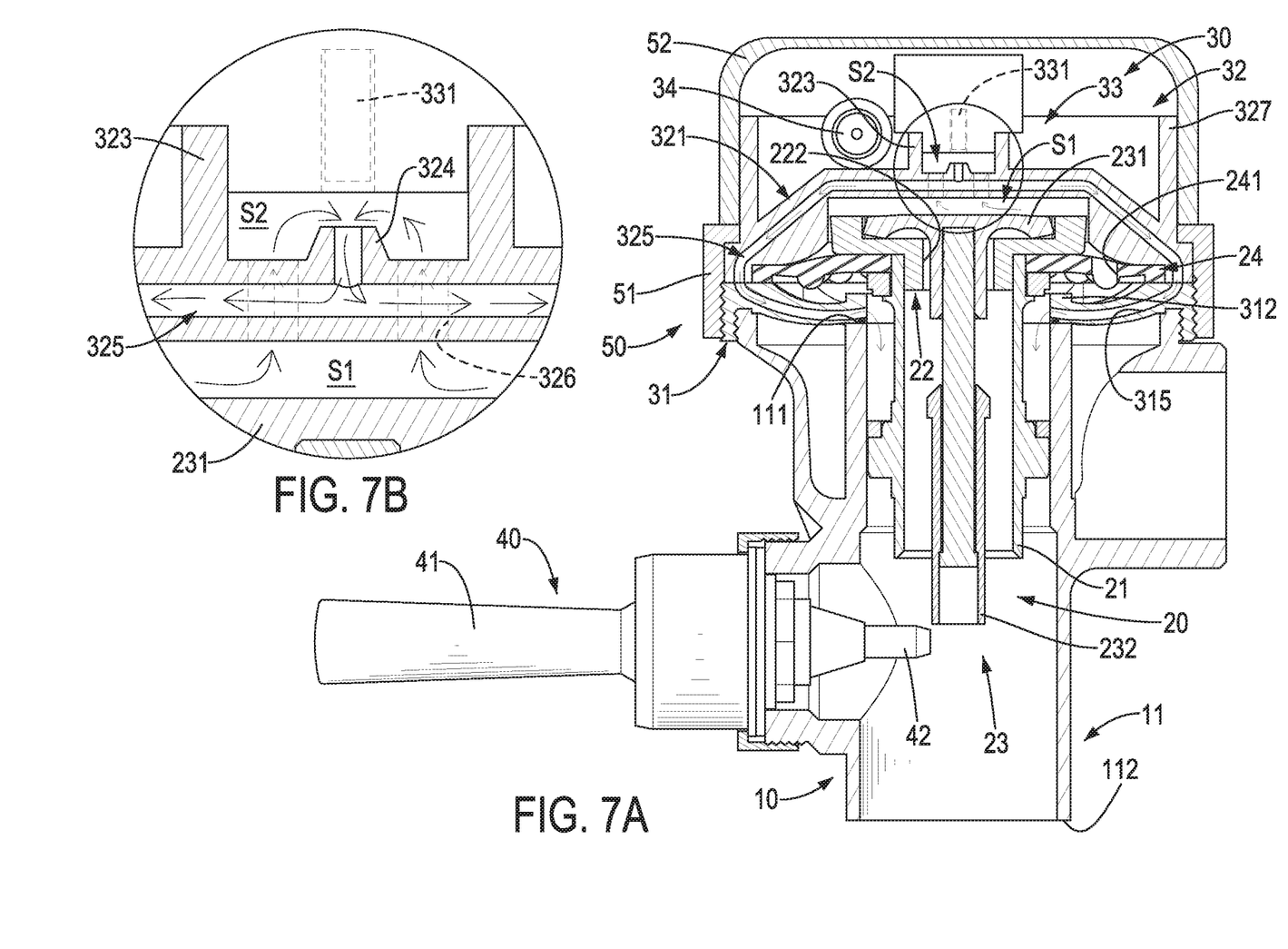
FIG. 7A is a schematic side view in partial section of the flush valve in FIG. 1, showing the water flushing.
FIG. 7B is an enlarged schematic side view in partial section of the flush valve in FIG. 1, showing the water flowing.

When the manual handle 41 is operated, water in the first reserving space S1 flows via the intake end 111 and no longer applies pressure to the diaphragm 24. The central portion of the diaphragm 24 rises and no longer presses the communicating ring 312. The inlet port 12 and the intake end 111 of the flushing tube 11 communicate with each other. Water introduced from the water supply is directly conducted into the flushing tube 11 and discharged at large flows.

When the flush valve in accordance with the present invention electrically operates, the sensor transmits signals to the blocking unit 331 of the solenoid valve 33 to leave the conical protrusion 324 without blocking the flowing channel 325. Water in the second reserving space S2 and the first reserving space S1 enters the two discharging channels 315 via the flowing channel 325 and the two openings 3251 of the flowing channel 325. Then, water is introduced into the communicating ring 312 via the two discharging channels 315, enters the guiding member 321 and is flushed out from the flushing tube eventually.

After flushing, the first reserving space S1 is empty and no longer applies pressure to the diaphragm 24. The central portion of the diaphragm 24 rises and no longer presses the communicating ring 312. The inlet port 12 and the intake end 111 of the flushing tube 11 communicate with each other. Therefore, water introduced by the water supply is directly introduced into the flushing tube 11 at large flows.

Compared to the conventional flushing valve, the flush valve in accordance with the present invention provides users with sensor-operating function and can be modified in coordination with the urinals or squat toilets. More significantly, the flush valve in accordance with the present invention preserves most parts of the conventional flush valve. A user can modify the conventional flush valve to make the conventional flush valve have sensor-operating function by only assembling the solenoid valve assembly 30 and the covering set 50 to the conventional flush valve. With slight changes and cooperation with the sensor, the conventional flush valve can be modified and be equipped with sensor-operating function.

In addition, a cover of the conventional flush valve is separated into the fastening collar 51 and the cover 52, wherein the fastening collar 51 is screwed with the seal 31, and the cover 52 is mounted on and around the circular wall 327 of the assembling mount 32. The fastening collar 51 and the cover 52 are two independent parts. When the power supply 34 is out of power, the cover 52 can be easily detached from the circular wall 327 for replacing the power supply 34.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A flush valve comprising:
a valve body having
a flushing tube disposed at a central position on the valve body and having an intake end and an outlet end opposite each other; and
an inlet port communicating with the intake end of the flushing tube;
a relief assembly having
a guiding member inserted inside the flushing tube;
a restricting disk fixed to the guiding member and disposed adjacent to the intake end;
a relief valve assembled to the restricting disk and having a valve stem protruding into the flushing tube; and
a diaphragm mounted on and around the guiding member and disposed below the restricting disk; and a solenoid valve assembly having
  a seal disposed between the diaphragm and the intake end, abutting against the intake end, mounted around the guiding member, and having
    multiple communicating holes defined through the seal and communicating with the inlet port; and
    at least one discharging channel formed inside the seal and communicating with the intake end;
  an assembling mount having
    a disk with two opposite sides;
    a flowing channel formed inside the disk, communicating with the two opposite sides of the disk, and communicating with one of the at least one discharging channel; and
    at least one flowing hole defined through the disk; and
a first reserving space disposed between the disk and the relief assembly;
wherein
the relief valve is disposed between the first reserving space and the flushing tube and selectively blocks the reserving space and the flushing tube;
the at least one flowing hole communicates with the first reserving space;
  a solenoid valve assembled to the assembling mount and having a block unit selectively blocking the flowing channel;
a second reserving space disposed between the solenoid valve and the assembling mount, and communicating with the flowing channel and the first reserving space via the at least one flowing hole; and
  a power supply electrically connected to the solenoid valve.

2. The flush valve as claimed in claim 1, wherein the seal has
  a communicating ring mounted around the guiding member; and
  multiple connecting portions disposed around the communicating ring separately; and
the at least one discharging channel is formed through one of the multiple connecting portions and extends inside the communicating ring to communicate with the intake end.

3. The flush valve as claimed in claim 2, wherein the solenoid valve assembly has an O-ring made of an elastic material; and
the O-ring is clamped between the communicating ring of the seal and the intake end of the flushing tube.

4. The flush valve as claimed in claim 2, wherein the assembling mount has
  a reserving recess disposed at one of the two opposite sides of the disk and defined in a central portion of the disk; and
  a baffle wall being circular, disposed at the other one of the two opposite sides of the disk, and connected to the central portion of the disk;
the first reserving space is formed by the reserving recess;
the flowing channel extends from the central portion of the disk within the baffle wall and communicates with the at least flowing hole;
the at least one flowing hole is defined through the central portion of the disk within the baffle wall and communicates with the reserving recess; and
the solenoid valve is assembled to the baffle wall.

5. The flush valve as claimed in claim 4, wherein the solenoid valve assembly has an O-ring made of an elastic material; and
the O-ring is clamped between the communicating ring of the seal and the intake end of the flushing tube.

6. The flush valve as claimed in claim 4, wherein the at least one discharging channel includes two said discharging channels;
the flowing channel has two openings accordingly; and
the two openings respectively align with the two discharging channels.

7. The flush valve as claimed in claim 6, wherein the solenoid valve assembly has an O-ring made of an elastic material; and
the O-ring is clamped between the communicating ring of the seal and the intake end of the flushing tube.

8. The flush valve as claimed in claim 6, wherein the assembling mount has a conical protrusion disposed at the central portion of the disk and within the baffle wall; and
the flowing channel is defined through the conical protrusion.

9. The flush valve as claimed in claim 8, wherein the solenoid valve assembly has an O-ring made of an elastic material; and
the O-ring is clamped between the communicating ring of the seal and the intake end of the flushing tube.

10. The flush valve as claimed in claim 8, wherein the flowing channel extends along a diametric direction of the disk to a rim of the disk to form the two openings.

11. The flush valve as claimed in claim 10, wherein the solenoid valve assembly has an O-ring made of an elastic material; and
the O-ring is clamped between the communicating ring of the seal and the intake end of the flushing tube.

12. The flush valve as claimed in claim 10, wherein the assembling mount has a circular wall connected to the disk and surrounding the baffle wall; and
the flush valve has a covering set having
  a fastening collar screwed with the seal; and
  a cover mounted on and around the circular wall of the assembling mount.

13. The flush valve as claimed in claim 12, wherein the solenoid valve assembly has an O-ring made of an elastic material; and
the O-ring is clamped between the communicating ring of the seal and the intake end of the flushing tube.

14. The flush valve as claimed in claim 12, wherein the flush valve has a manual assembly mounted to the valve body and having
  a manual handle disposed outside the valve body; and
  a plunger connected to the manual handle and extending into the flushing tube; and
the plunger is capable of pushing the valve stem.

15. The flush valve as claimed in claim 14, wherein the solenoid valve assembly has an O-ring made of an elastic material; and
the O-ring is clamped between the communicating ring of the seal and the intake end of the flushing tube.

16. The flush valve as claimed in claim 1, wherein the solenoid valve assembly has an O-ring made of an elastic material; and
the O-ring is clamped between the seal and the intake end of the flushing tube.

* * * * *